United States Patent [19]
De Filippis

[11] Patent Number: 5,825,108
[45] Date of Patent: Oct. 20, 1998

[54] BRUSHLESS ELECTRIC MOTOR, PARTICULARLY FOR DIRECT DRIVING OF A WASHING MACHINE

[75] Inventor: Pietro De Filippis, Monza, Italy

[73] Assignee: Bitron S.p.A., Grugliasco, Italy

[21] Appl. No.: 584,563

[22] Filed: Jan. 11, 1996

[30] Foreign Application Priority Data

Jan. 10, 1995 [IT] Italy ................................. TO95A0009

[51] Int. Cl.⁶ .......................... H02K 67/00; H02K 11/00
[52] U.S. Cl. ..................... 310/67 R; 310/68 D; 310/254; 310/259; 310/269; 417/368; 417/423
[58] Field of Search .................................. 310/254, 268, 310/67 R, 259, 269, 68 D; 417/368, 423

[56] References Cited

U.S. PATENT DOCUMENTS

| | | | |
|---|---|---|---|
| 3,636,393 | 1/1972 | Pieper ........................................ | 310/71 |
| 3,867,654 | 2/1975 | Otto ........................................... | 310/42 |
| 4,061,121 | 12/1977 | MacLeod ............................. | 123/149 R |
| 4,093,897 | 6/1978 | Fujita et al. ............................. | 218/138 |
| 4,613,781 | 9/1986 | Sanders .................................... | 310/239 |
| 5,001,412 | 3/1991 | Carter et al. .............................. | 322/10 |
| 5,044,883 | 9/1991 | Neuder .................................. | 415/214.1 |
| 5,176,509 | 1/1993 | Schmider et al. ................... | 417/423.7 |
| 5,217,353 | 6/1993 | De Filippis ............................ | 417/368 |

Primary Examiner—Steven L. Stephan
Assistant Examiner—Elvin G. Enad
Attorney, Agent, or Firm—Merchant, Gould, Smith, Edell, Welter & Schmidt

[57] ABSTRACT

The motor comprises a rotor (30) fixed for rotation with a shaft (36) of a member to be driven and a crown-like stator (10) obtained by blanking a lamination stack (12) provided with coil supporting teeth (11). Within the stator crown (10) there are obtained by blanking the lamination stack (12) a plurality of receptacles (13, 15, 17) for seating electric and electronic components associated with the stator. The components comprise a transformer (24), an inductance coil (25), and a plurality of MOSs (23). The stator crown (10) is co-molded with a covering of electrically insulating plastic material to cover the receptacles (13, 15, 17) and the teeth (11) and form a tank (22) for receiving a printed circuit (21). The permanent magnet rotor is fitted with stacks of small pieces (19) obtained by blanking lamination portions within the stator crown (10). The stacks of small pieces face the magnets (31) so as to close the respective magnetic circuits.

13 Claims, 7 Drawing Sheets

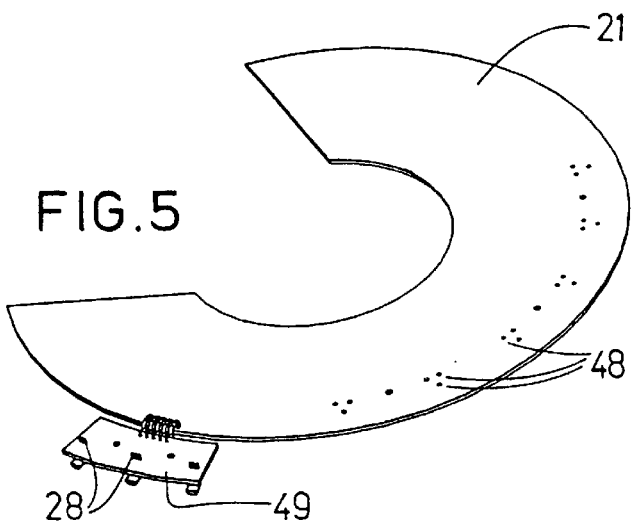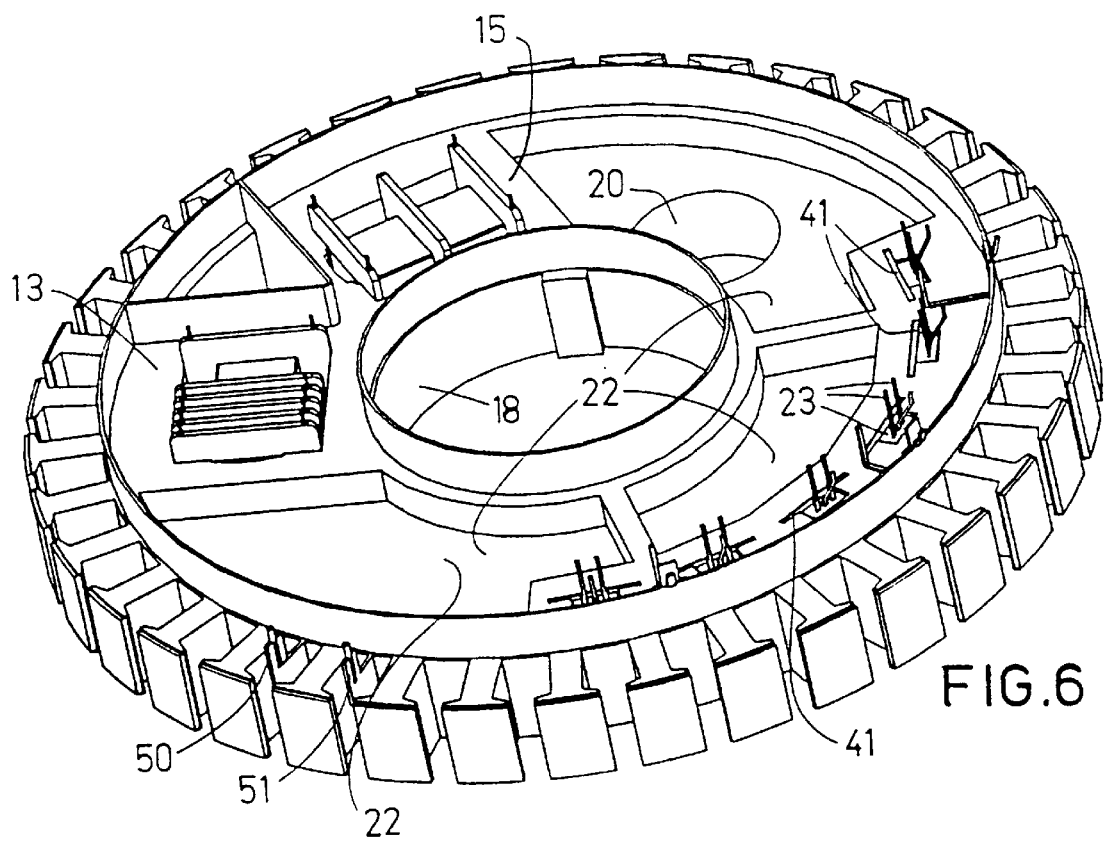

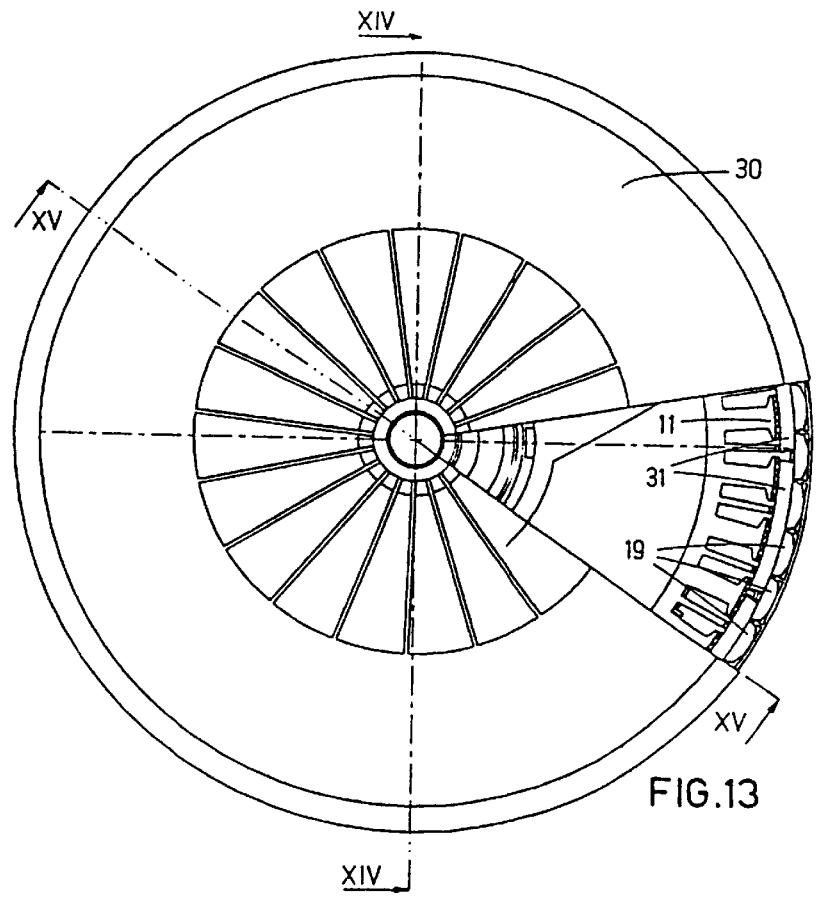
FIG.13
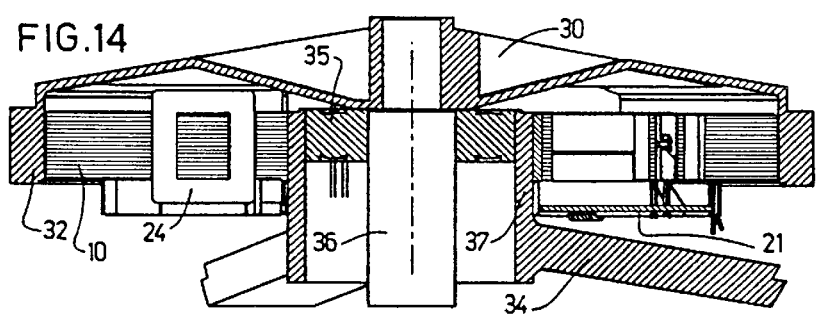
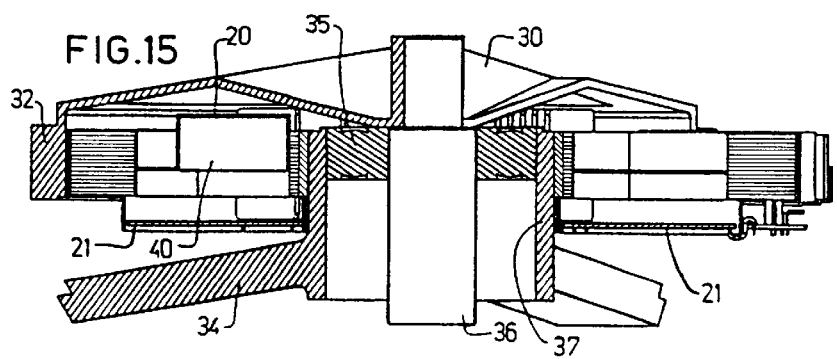

BRUSHLESS ELECTRIC MOTOR, PARTICULARLY FOR DIRECT DRIVING OF A WASHING MACHINE

FIELD OF THE INVENTION

The present invention generally pertains to the field of brushless electric motors. More particularly, the invention relates to a brushless electric motor for direct driving of the cylinder of a washing machine.

BACKGROUND OF THE INVENTION

Direct drive washing machines employing a brushless electric motor are known, as well as the advantages inherent to such an application.

In prior art arrangements, the various components forming the control and drive system for the washing machine cylinder are distributed at various locations, so that the motor is at one location, the electronic signal components are located somewhere else, and the power electronic components and filters are still further apart.

As apparent, such a dispersed arrangement of the various components takes up a lot of space and renders the unit likely to suffer from failures owing to the use of several connecting cables and relevant connectors being dispersed within the washing machine housing.

Where the electric motor is of very flat construction and is made of lamination stack with a high number of poles, the rotor with permanent magnets and the stator with copper wire coils, exploit only a small portion of the overall amount of the laminations being used.

In manufacturing a stator armature from a lamination stack, all those parts of the lamination being inside or outside of the crown of the stator are unused. The stack structure has a high surface to thickness ratio, whereby most of the lamination would be wasted.

As a result, some manufacturers who heretofore made attempts to construct an electric motor as discussed above, have given up the idea of using blanked laminations and have followed other ways to provide the crown or ring-like active portion and so avoid the cited waste of lamination.

However, the other proposed solutions have a number of problems concerning flatness and concentricity of the ring or crown member. This member has to be perfectly centered with respect to the rotor axis such that the air gap between the rotor and the stator is consistent and as narrow as possible throughout the circumference. While other solutions save all the iron within the ring or crown by providing a plastic member for supporting the rotor, the plastic member turns out to be rather costly.

At present, methods of constructing the rotor consist of blanking a whole ring made of stacked laminations, or obtaining a separate ring by a process different from blanking.

SUMMARY OF THE INVENTION

A main object of the present invention is to provide a compact unit containing all members making up the motor, the filters, the signal and power electronic components.

It is an object of the invention to minimize the bulk, the required space, and the number of connection points, in order to exploit the materials as much as possible, as will be apparent hereinafter.

These and further objects are attained according to the present invention by the provision of a permanent magnet brushless electric motor, particularly for direct drive of a member such as the cylinder of a washing machine, the motor comprising a rotor fixed for rotation with a shaft of the member to be driven and rotating with respect to a crown-like stator obtained by blanking a lamination stack provided with coil supporting teeth; characterized in that within the stator crown there is a plurality of receptacles for seating corresponding electric and electronic components operationally associated with the stator, the components comprising a transformer, an inductance coil, a plurality of MOSs; the stator crown being co-molded with a covering of electrically insulating plastic material to cover the receptacles and the teeth, before mounting of the components, and to form at least one tank for receiving a printed circuit; the permanent magnet rotor being fitted with small pieces facing the magnets externally so as to close the respective magnetic circuits; the small pieces being obtained by blanking further lamination portions within the stator crown; the stator crown being force-fitted to a fixed supporting structure crossed by the shaft being driven directly by the rotor.

BRIEF DESCRIPTION OF THE DRAWINGS

For a better understanding of the present invention, reference is made to the following detailed description of a preferred embodiment considered in combination with the accompanying drawings in which:

FIGS. 2 to 4 and 6 to 8 illustrate different successive steps in constructing the stator of the motor according to this invention;

FIG. 5 is a printed circuit card for the stator;

FIGS. 12 and 13 illustrate the motor mounted to a fixed structure provided in the washing machine; and FIGS. 14 and 15 are section views taken along lines XIV—XIV and XV—XV, respectively, of FIG. 13.

DETAILED DESCRIPTION OF THE INVENTION

Figure 1:
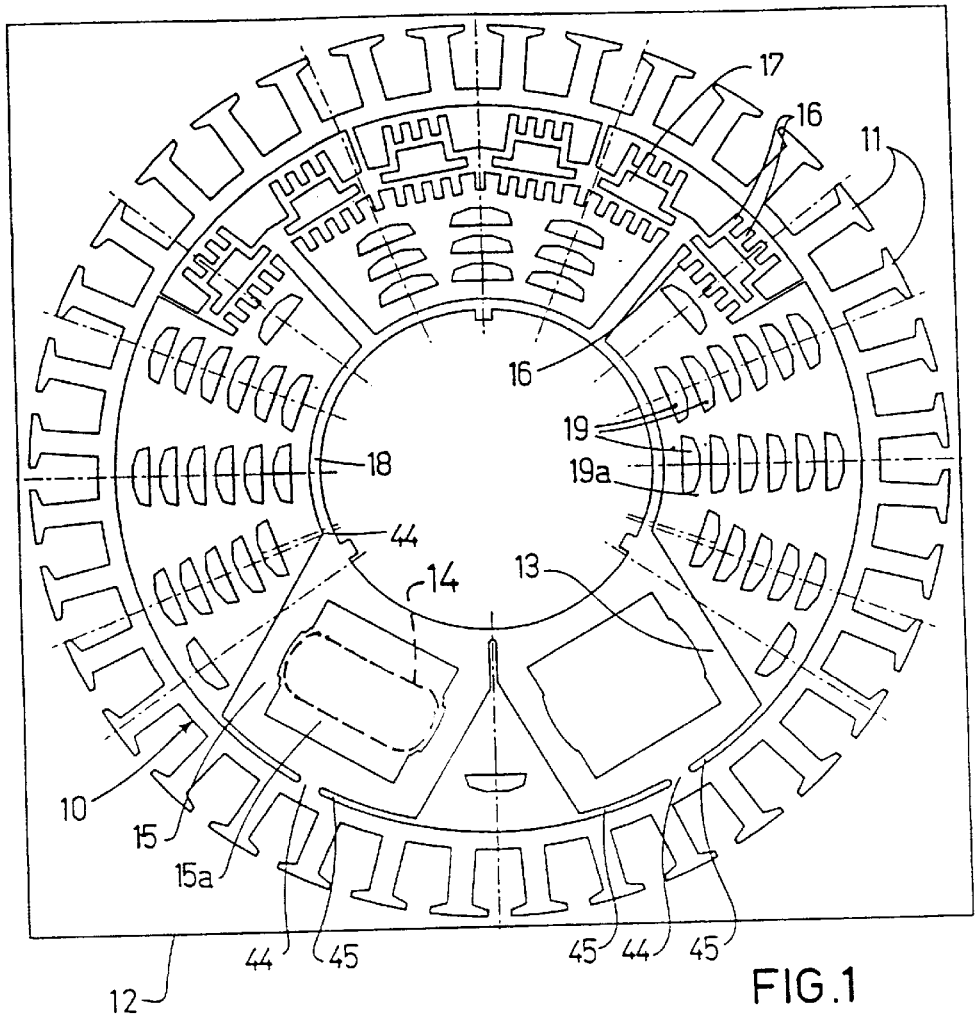
FIG. 1 is a plan view of a lamination used in accordance with the present invention.

With reference to FIG. 1, the active part of the stator is the circular crown 10 having conventional teeth 11 on which are wound copper wire coils (not shown) defining the phases.

The solution proposed by the present invention allows the use of most of the lamination which does not form the crown or active part of the stator. The construction of the motor has the aim of exploiting the iron of the lamination as much as possible.

While accomplishing this object, the problem of having all the cited components distributed in different parts of the machine is resolved, as such components are all integrated in the motor.

In FIG. 1 there is illustrated the structure of a single blanked lamination 12; numeral 13 designates a structural portion of the lamination which forms the outer body of a transformer. From FIG. 1 it is clear that the housing 13 of the transformer, although being mechanically connected to the lamination structure, has connections 44 located at equipotential points not crossed by magnetic flux. Owing to slots 45 which determine the connections 44, the external housing of the transformer is magnetically disconnected from the rest of the primary magnetic circuit of the motor poles.

Designated at 14 in phantom is the transformer core which is obtained by blanking the same lamination 12. The core 14 is fitted with a bobbin with primary and secondary windings (nor shown) and then inserted back into seat 13.

Thus, as this portion of the machine contains the feeding transformer and all the secondary windings, the problem of where the transformer should be located is solved. Also the problem concerning utilization of the iron 14 extracted from the lamination stack is solved. The same applies to the adjacent structure 15 which provides a receptacle where a core (not shown) is fitted. This core is blanked from hollow 15a and is so fixed as to leave an air gap to ensure correct operation of its windings. Primary and secondary coils are wound, respectively connected to the mains. The transformer and the coil are so located in a space that would have not been used otherwise, while using iron of the same stator structure.

At the bottom of FIG. 1 it is shown how part of the lamination 12 is exploited to provide cooling fins 16 and pockets 17.

In order to further exploit the remainder of the iron a series of small pieces 19 of lamination (FIG. 1), to be described in detail herein after, are blanked and successively stacked in known manner.

Figure 2:
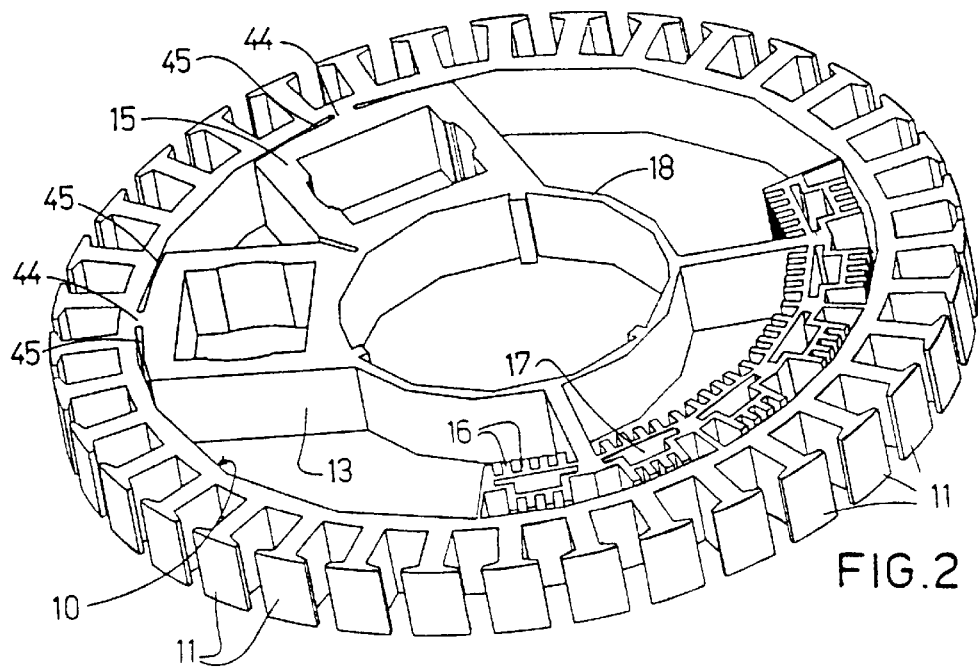

Referring to FIG. 2, the lamination stack is blanked so as to provide a crown 10 with outer teeth 11, transformer and filter seats 13 and 15, and pockets 17 with fins 16 for accommodating power components (MOS). There is also defined an inner ring 18 connected to seats 13, 15, pockets 17 and toothed crown 10. The remainder is blanked and removed.

Being obtained by blanking, the central iron ring 18 that is to be fixed to the machine structure, is very accurate in shape. This accuracy assures centering of the structure supporting the motor. Consequently, an air gap of constant width is provided with respect to the rotor.

A great percentage of the iron of the square lamination to be initially blanked is therefore used. This is particularly interesting for washing machine applications, where another electric machine is provided, i.e. the pump. Advantageously, the central portion of the iron obtained from the inside of the ring 18 can be used for the pump. The central portion can be used to form the lamination stack for the washing machine pump.

It will be appreciated that the iron is exploited as much as possible in forming the electric motor and the pump of a washing machine.

Upon stacking the stator laminations with known techniques (FIG. 2), the whole stator stack is co-molded so as to be covered with a layer of electrically insulating plastic material, thereby insulating all parts that require this provision. MOSs 23 are then inserted in pockets 17 with fins 16. As for receptacles 13 and 15, a part of the motor laminations is used to cool the electronic power components using the same lamination iron, thereby solving a problem of space taken up by the MOSs and their dissipators.

Before insertion in a corresponding pocket 17, each MOS is fixed to a copper or aluminum tongue 41 of greater size than the MOS and which contacts with the MOS directly. By having a large area contacting the insulating surfaces, the tongues 41 allow for satisfactory heat dissipation. On the contrary, thermal resistance would be too high should the contact surface be limited to the contact area between the MOS and the relevant pocket. In fact, the plastic layer has to be quite thick to assure electrical insulation, but this requirement contrasts with the need to provide efficient thermal exchange. By the present arrangement, each MOS is fitted to a corresponding tongue 41 and provides a large resting surface. Such a surface assures that thermal resistance between the MOS and the stator iron is adequate to the power being applied.

In addition, as direct current flows in the windings of this kind of motor, specifications require double insulation, one functional and one for safety.

The first insulation is attained by the co-molded plastic material insulating the coils (not shown) that are wound on the iron teeth. The second insulation is provided in the central part 18a in that the plastic covering is also interposed between the iron and the supporting structure of the machine. The windings are therefore insulated from the iron, while the iron of the stator stack is in turn insulated from the structure of the machine in which the motor is installed.

Figure 3:
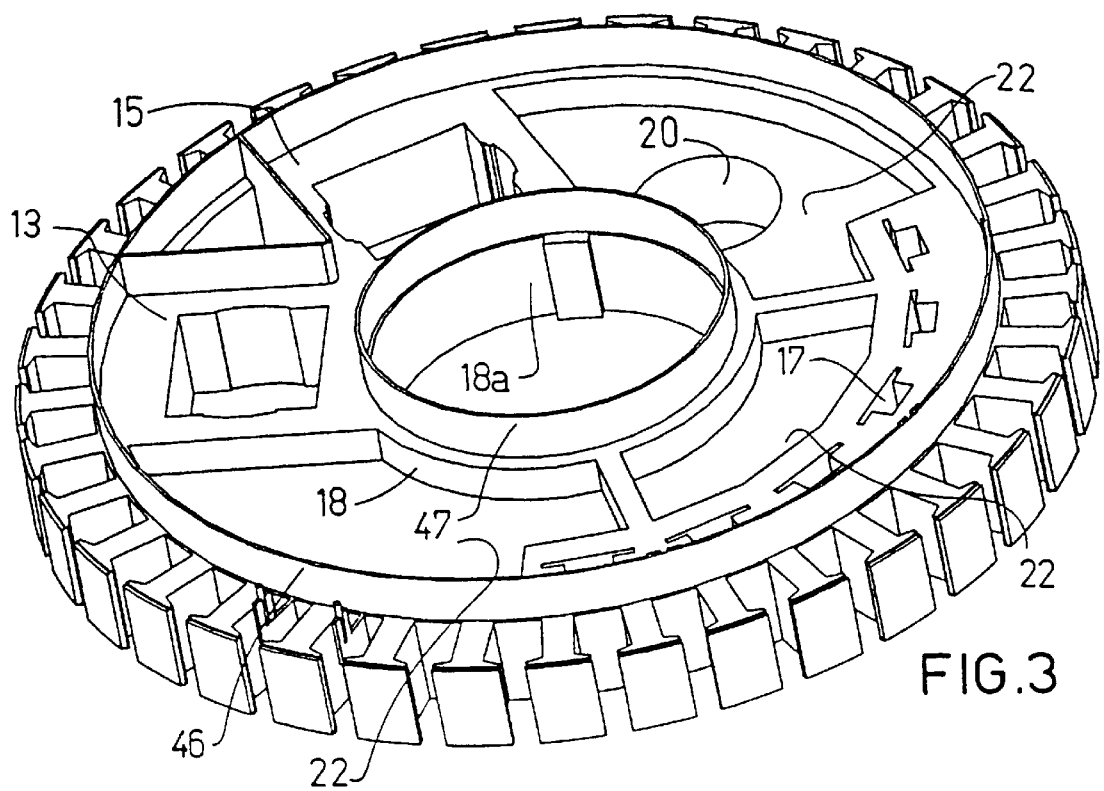

For illustration purposes, FIG. 3 depicts the plastic covering separately from the lamination stack on which it is co-molded. The plastic covering copies the shape of the stack, and so covers seats 13, 15, pockets 17, and teeth 11. Co-molding also provides a further receptacle 20 adapted for seating a capacitor 40 (FIG. 15). On one of the two stator faces, the same co-molding operation forms two upright edges 46, 47 delimiting one or more communicating tanks 22, the purpose of which is discussed herein after.

Figure 4:
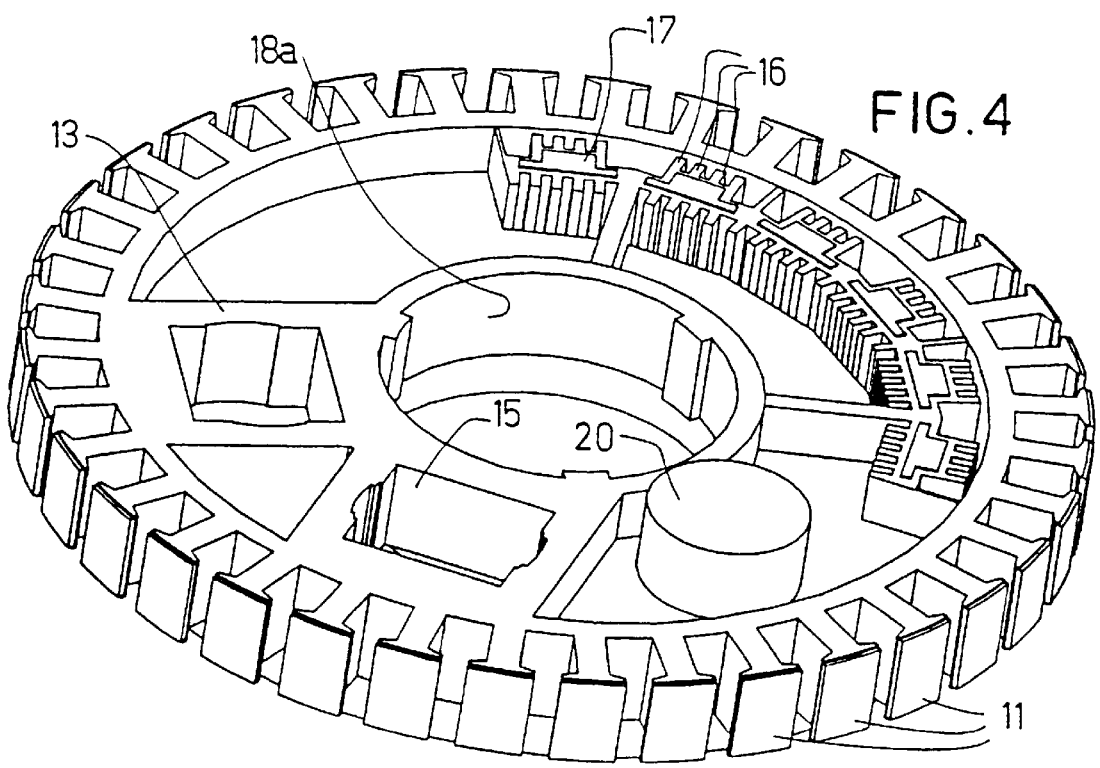

FIG. 4 shows the covered lamination stack, as seen from the opposite side of FIG. 3.

As discussed, all the sectors from which the small iron pieces 19 are extracted provide areas where the electronic circuit for driving the motor can be located. The circuit and relevant tracks are not described in detail herein. All components for controlling operation of the motor can be mounted on a printed circuit 21, preferably shaped as illustrated in FIG. 5.

Figure 7:
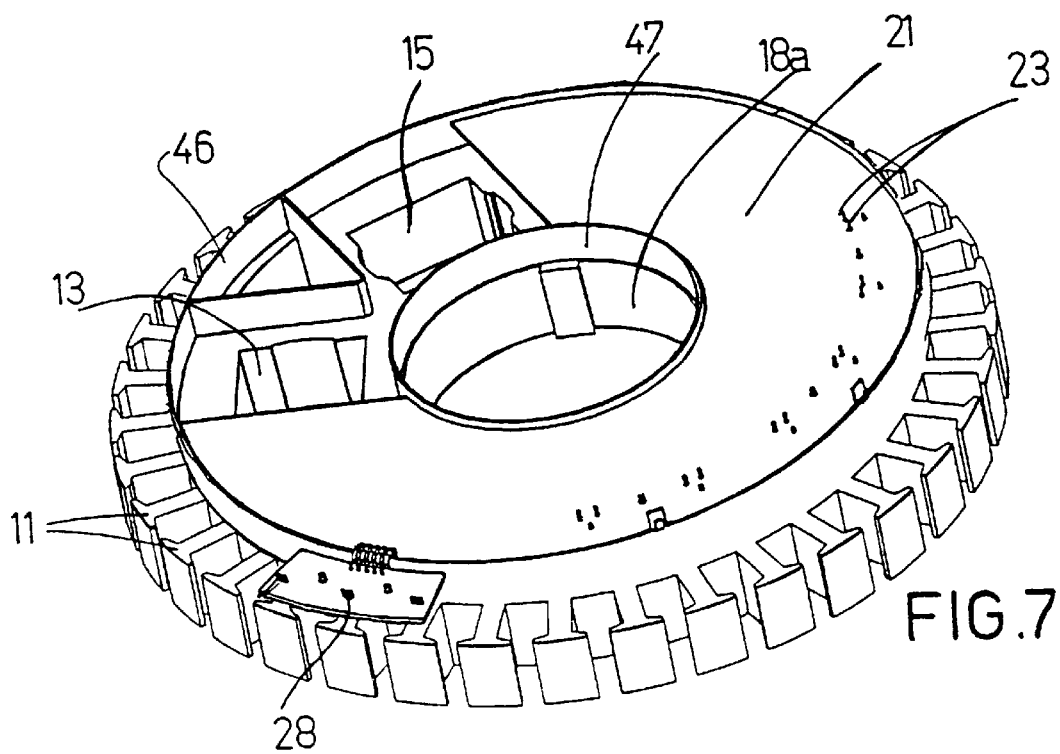
Figure 8:
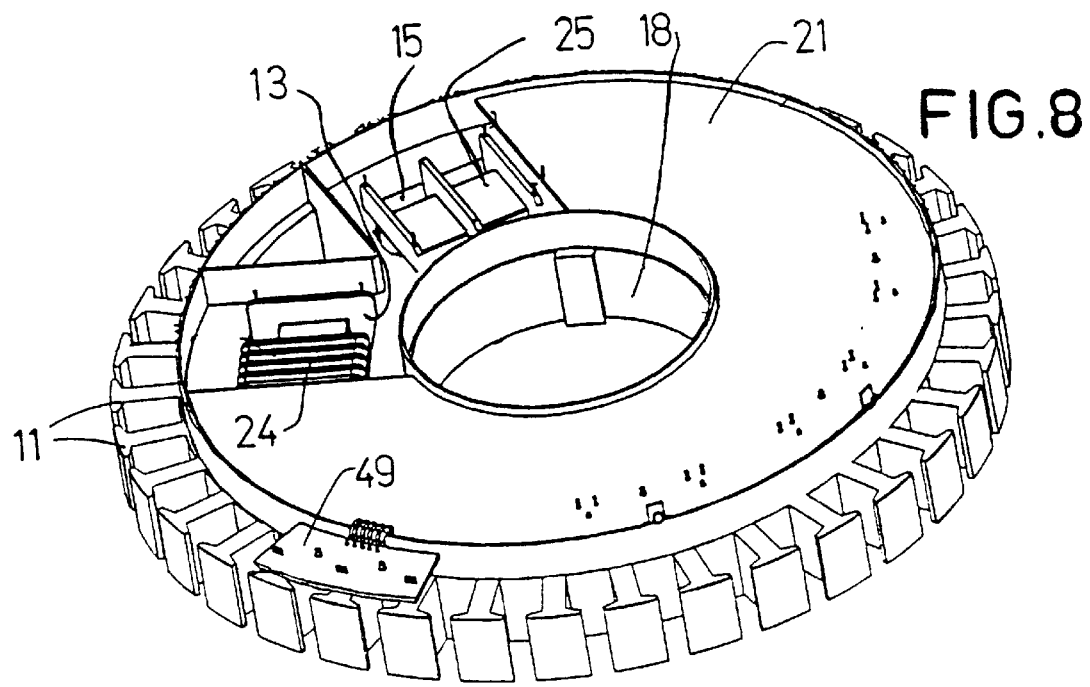

The printed circuit 21 has a shape that copies that of co-molded tanks 22. The printed circuit is positioned on the lower face of the stator. More particularly, the printed circuit 21 is inserted in tank 22 (FIG. 6) at a level lower than edges 46 and 47. The printed circuit 21 has apertures 48 (FIG. 5) adapted for allowing passage of the stems of the MOSs 23 and welding same to the printed circuit tracks. The result is shown in FIG. 7. Obviously, the winding leads are likewise connected to the printed circuit.

Also connected to the printed circuit 21 is a further printed circuit 49 for supporting Hall sensors 28 for driving the rotor. Printed circuit 49 is anchored to the co-molded covering at 50 and 51. The power components are this directly connected to the printed circuit, which is further directly connected also to a transformer 24 and an inductance coil 25 inserted in the special seats 13, 15, respectively. Not only are economical benefits provided by this invention, but also reliability is improved. In fact, the most delicate points of this kind of structure consist of connector interconnections.

The disclosed arrangement reduces cables and relevant interconnection problems to a minimum, as most of the electric connections are provided on the printed circuit 21 with welding points controlled and tested by the electric motor manufacturer.

Tank 22 can be filled with resin so as to cover the printed circuit completely, thereby protecting the electronic components and relevant connections from water, dirt, and other contaminating agents.

Figure 9:
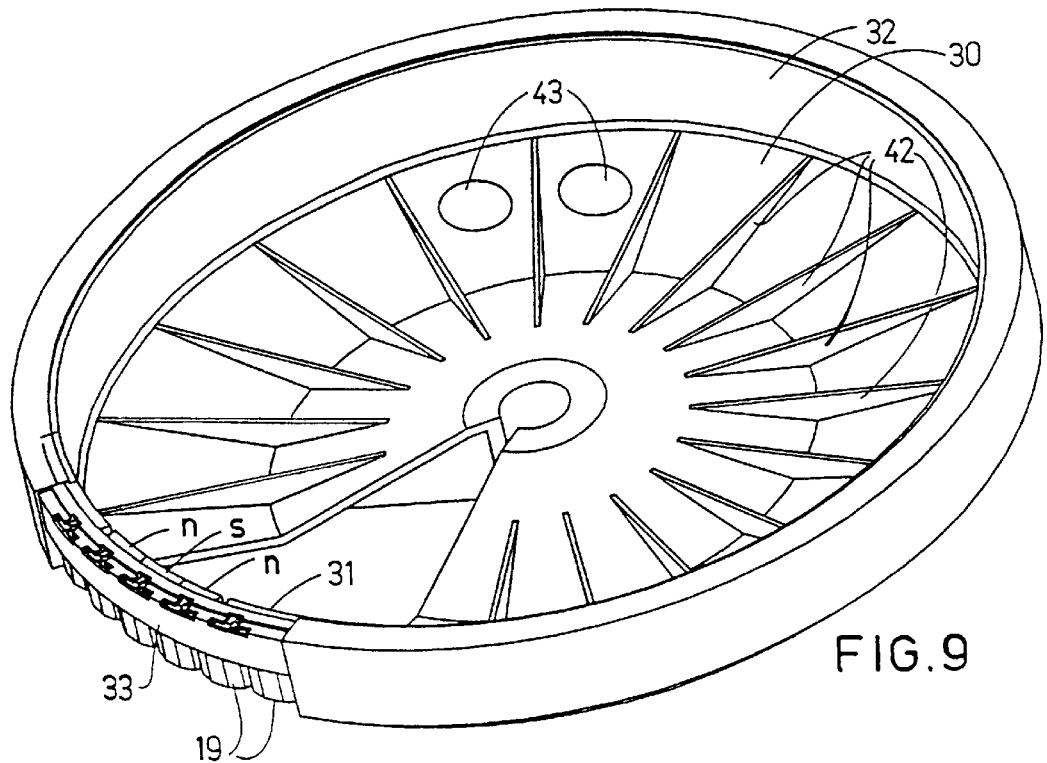
FIGS. 9 and 10 illustrate the rotor of the electric motor of the present invention.
Figure 10:
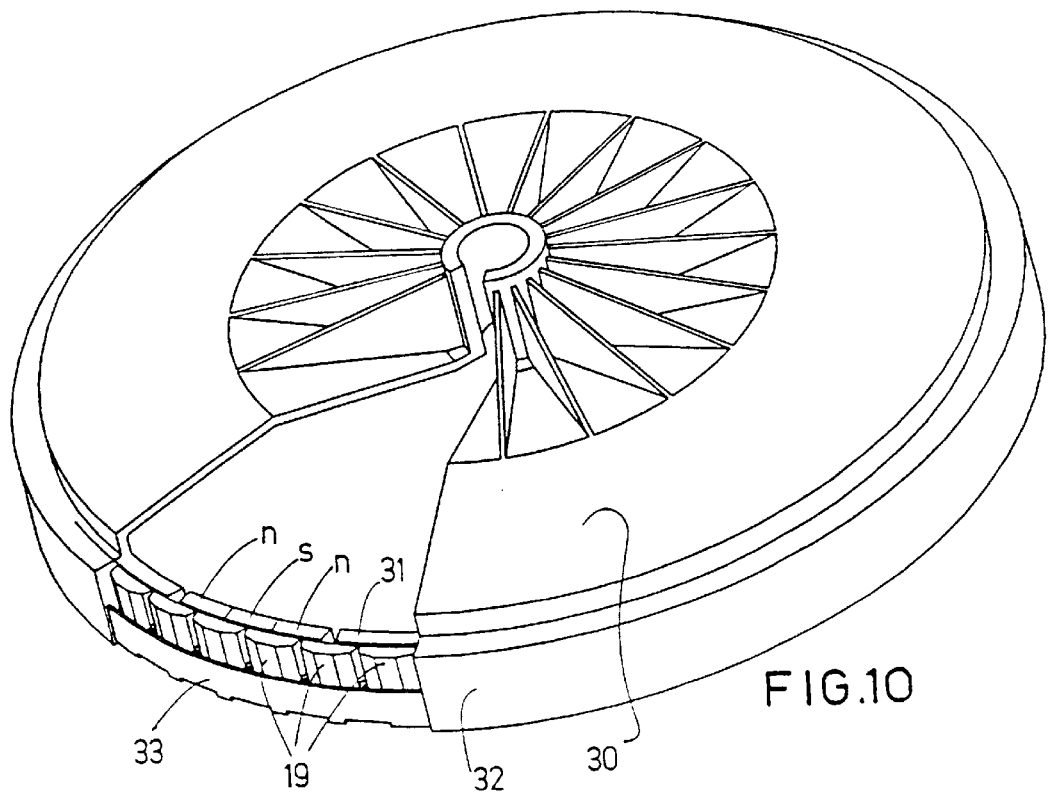
Figure 12:
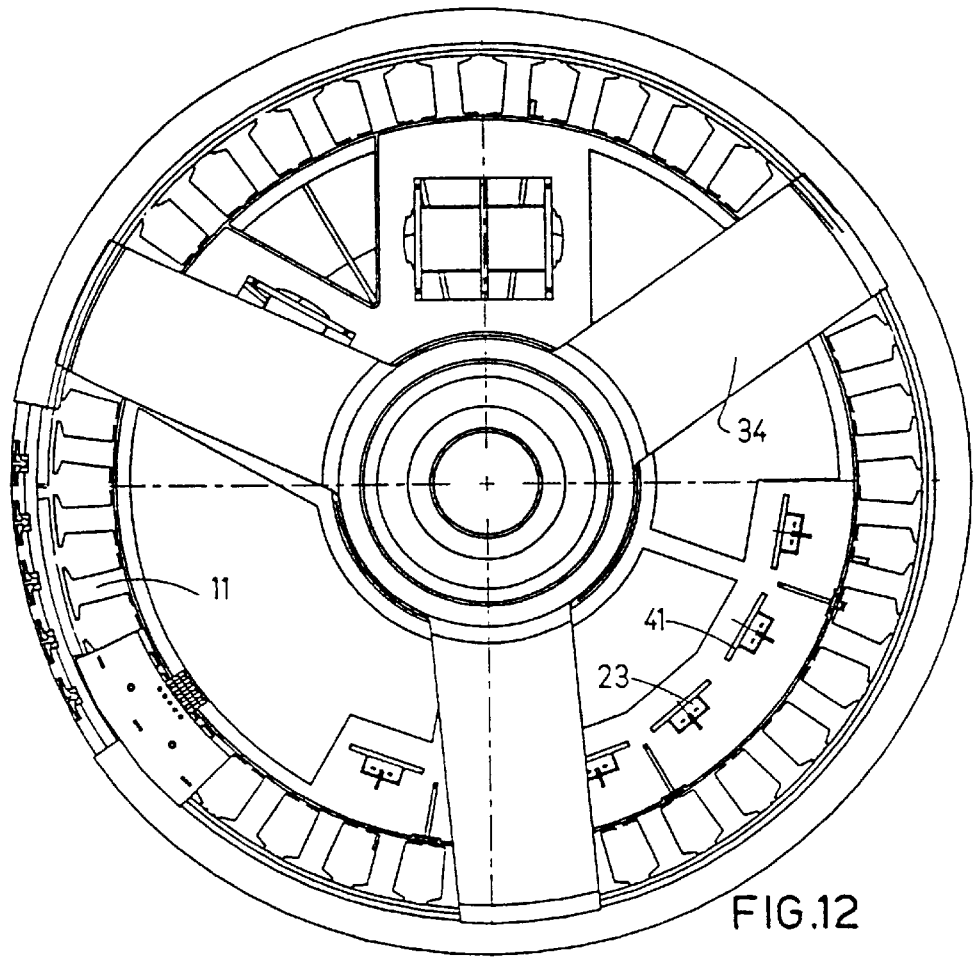
Figure 11:
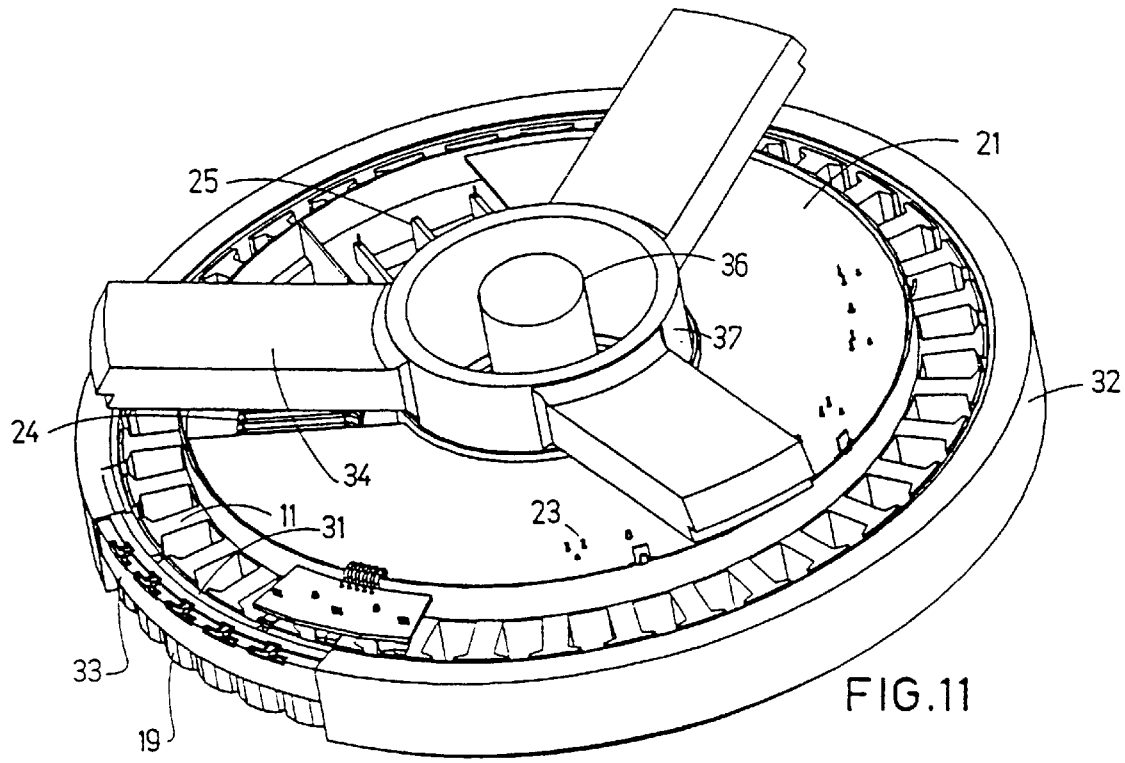
FIG. 11 shows the arrangement of the rotor relative to the stator.

The rotor 30 of the electric motor is depicted in its main views in FIGS. 9 and 10, and in FIGS. 12 to 15 it is shown coupled to the stator. Rotor 30 consists of a cup-like circular body that carries permanent magnets 31 along the inner side of its peripheral edge 32. Facing the outside of the magnets 31 are flanked stacks of the small pieces 19 which are obtained by blanking the lamination stack 12 (FIG. 1). The stacks of small pieces are retained against the magnets 31 by an outer cage 33 which assures correct positioning of the small pieces with respect to the magnets.

Generally, the rotor magnets face an iron ring that forms the member closing the magnetic circuit. In the present case, such an iron outer ring is constituted by the small pieces 19. The small iron pieces 19 are arranged in front of the magnets 31 such that if north and south are alternate, as is the case of the present motor (FIG. 10), the maximum of the closing flux is located in the middle between the north and the south, whereas at the center of each pole the flux will bifurcate on the left and the right and close on the other poles. Therefore, such an arrangement where iron blocks 19 are positioned between the center of each pole and the center of each successive pole allows for ideal exploitation of available iron without modifying operation of the motor.

As shown in FIG. 10, magnet 31 is preferably magnetized with three poles, i.e. north-south-north.

Still according to the present invention, radial fins 42 and/or apertures 43 can be provided within the cup 30 for improving cooling of the stator, and particularly of fins 16 (FIG. 2) for improving heat exchange of the MOS.

The complete motor is illustrated in FIGS. 12 to 15. Brackets 34 for mechanical connection to the cylinder (not shown) of the washing machine extend from a cylindrical body 37. The inside of cylindrical body 37 has bearings 35 secured to the machine, while the outside of body 37 carries the stator. The rotor is force fitted on and drives a shaft 36 of the cylinder. This arrangement which is currently known for washing machines requires suitable modifications to fit the stator.

As apparent, one of the structural advantages is that the motor in accordance with the present invention does not need bearings of its own as it uses the shaft and the bearings of the washing machine in which it is installed.

Further, the motor of this invention is silent as it works at low revs. The present invention mainly resides in the discussed provisions for constructing a flat motor for direct drive of a washing machine. The proposed solution attains the objects with minimum cost, taking up very little space. Further, it allows the supply of the complete and tested motor to the washing machine manufacturer, such that the latter will no longer need to carry out tests and adjustments. Currently, the washing machine manufacturer has to buy separate parts and then test the assembled unit as a finished product.

It is to be understood that the embodiment described above is merely exemplary and that persons skilled in the art may make many modifications without departing from the spirit and scope of the invention. All such modifications and variations are intended to be included within the scope of the invention as defined by the appended claims.

I claim:

1. A permanent magnet brushless electric motor for direct drive of a member, the motor comprising a rotor fixed to and rotatable with a shaft of the member to be driven and rotating with respect to a crown-like stator provided with coil supporting teeth, said crown-like stator being formed of a lamination stack that has been blanked; wherein the stator crown includes a plurality of receptacles formed within the lamination stack by blanking for seating corresponding electric and electronic components operationally associated with the stator, said components comprising a transformer, an inductance coil, and a plurality of MOSs; said stator crown further includes a molded covering of electrically insulating plastic material that covers said receptacles and said teeth, said electrically insulating plastic material being molded over the stator crown before seating of said components within the receptacles, and at least one tank defined by said covered stator crown and that receives a printed circuit; the permanent magnet rotor includes small pieces which face outer surfaces of magnets of the permanent magnet rotor so as to close respective magnetic circuits; said small pieces being obtained by blanking portions of the lamination stack of said stator crown; said stator crown being force-fitted on a fixed supporting structure through which said shaft extends, said shaft being driven directly by the rotor.

2. An electric motor according to claim 1, wherein said transformer and said inductance coil include central cores, said central cores are formed of laminations that are obtained respectively from the laminations that are blanked for forming said receptacles that receive said components.

3. An electric motor according to claim 1, wherein the receptacles for said components are connected to the crown of the stator and a central ring concentric to the crown said central ring is formed by blanking said laminations of said stator.

4. An electric motor according to claim 3, wherein the laminations that are blanked for forming said central ring make up a body of another electric machine.

5. An electric motor according to claim 3, wherein two of said receptacles are connected to a peripheral portion of the stator crown through respective connections located at magnetically equipotential points, said connections being defined by slots; said connections and slots being arranged such that said two receptacles are magnetically disconnected from each other and a main magnetic circuit of the motor.

6. An electric motor according to claim 1, wherein cooling fins extend outwardly from the receptacles that contain said MOSs, said cooling fins being formed by blanking said laminations of said stator.

7. An electric motor according to claim 1, wherein the printed circuit has a shape that is congruent with a shape of the tank, said printed circuit covering the MOSs and leaving the transformer and the inductance coil at least partially uncovered.

8. An electric motor according to claim 1, wherein the stator crown includes an additional seat, said additional seat being adapted for receiving a capacitor.

9. An electric motor according to claim 1, wherein the small pieces are piled in flanked groups facing the permanent magnets so as to be positioned between a center of each pole and a center of the pole adjacent to said magnets.

10. An electric motor according to claim 1, wherein resin is disposed in spaces between the receptacles and covers the printed circuit.

11. An electric motor according to claim 1, wherein each MOS directly contacts at least one metal tongue adapted for dissipating heat of the MOS.

12. An electric motor according to claim 11, wherein a surface of said tongue is larger than that of the MOS to which it is coupled.

13. An electric motor according to claim 3, further including a safety electrical insulation on an inner surface of said central ring, said central ring being coupled to said fixed structure.

* * * * *